(12) United States Patent
Slowiak et al.

(10) Patent No.: US 7,490,155 B1
(45) Date of Patent: Feb. 10, 2009

(54) MANAGEMENT AND CONTROL FOR INTERACTIVE MEDIA SESSIONS

(75) Inventors: Gregory Slowiak, Cary, IL (US); Anoop Tripathi, Lake Zurich, IL (US); Michael Dempsey, Park Ridge, IL (US)

(73) Assignee: 3Com Corporation, Marlborough, MA (US)

( * ) Notice: Subject to any disclaimer, the term of this patent is extended or adjusted under 35 U.S.C. 154(b) by 964 days.

(21) Appl. No.: 10/389,518

(22) Filed: Mar. 13, 2003

(51) Int. Cl.
*G06F 13/00* (2006.01)

(52) U.S. Cl. ...................... 709/227; 709/237
(58) Field of Classification Search ............... 709/227, 709/237
See application file for complete search history.

(56) References Cited

U.S. PATENT DOCUMENTS

| | | | |
|---|---|---|---|
| 6,625,141 B1 * | 9/2003 | Glitho et al. | 370/352 |
| 7,200,139 B1 * | 4/2007 | Chu et al. | 370/352 |
| 7,266,593 B2 * | 9/2007 | Faccin et al. | 709/220 |
| 2004/0073658 A1 * | 4/2004 | Oran et al. | 709/224 |
| 2004/0125802 A1 * | 7/2004 | Lillie et al. | 370/390 |
| 2004/0203710 A1 * | 10/2004 | Gabor et al. | 455/422.1 |
| 2005/0033684 A1 * | 2/2005 | Benedyk et al. | 705/39 |

OTHER PUBLICATIONS

H. Schulzrinne, S. Casner, R. Frederick, V. Jacobson, Internet Engineering Task Force, ("IETF"), Request for Comments ("RFC") RFC-1889, "RTP: A Transport Protocol for Real-Time Applications", Jan. 1996, Entire document.

\* cited by examiner

*Primary Examiner*—Kenneth R Coulter
(74) *Attorney, Agent, or Firm*—McDonnell Boehnen Hulbert & Berghoff LLP

(57) ABSTRACT

A method for management and control of a media session. The method comprises receiving a first message from an end user device at an application server to initiate a media session and forwarding the first message from the application server to a media server. A first media transaction between the media server and the end user device is then conducted. The method further comprises, receiving a second message from the media server at the application server to indicate that the first media transaction is complete. The method still further comprises transmitting a third message from the application server to the media server to initiate a second media transaction and conducting the second media transaction. After the second media transaction is complete, the method comprises and receiving a fourth message from the media server at the application server indicating that the second media transaction is complete.

22 Claims, 4 Drawing Sheets

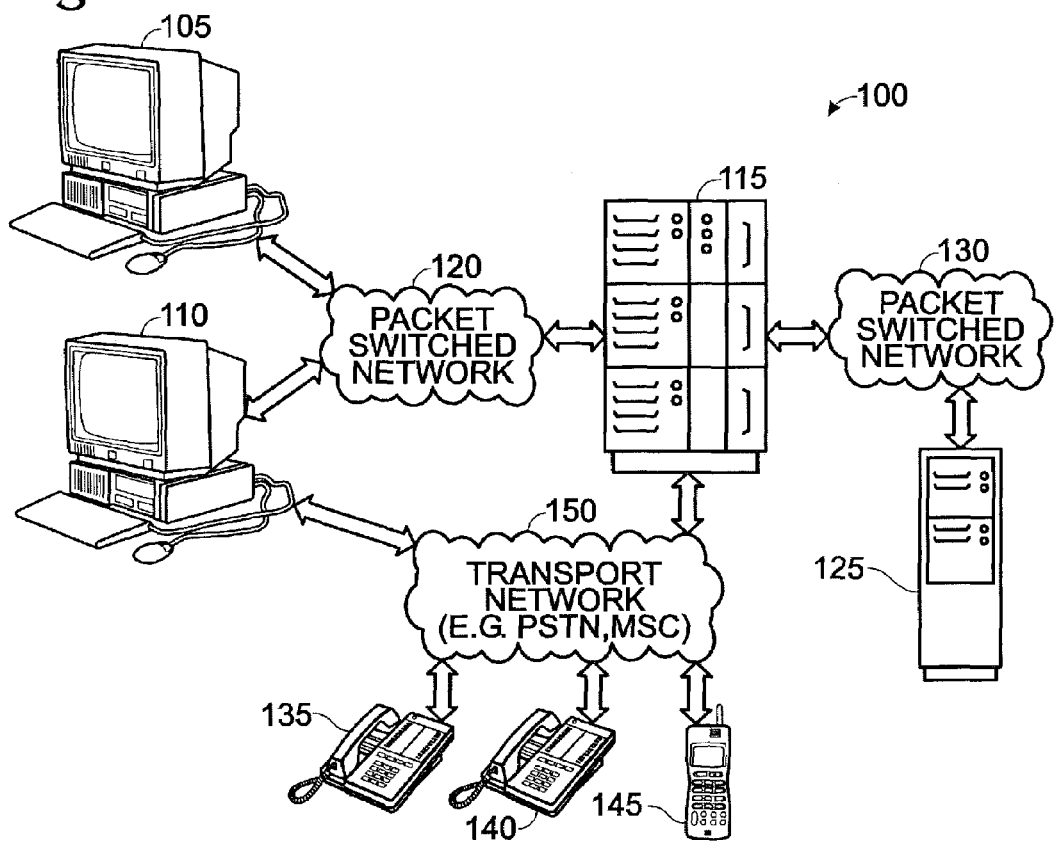
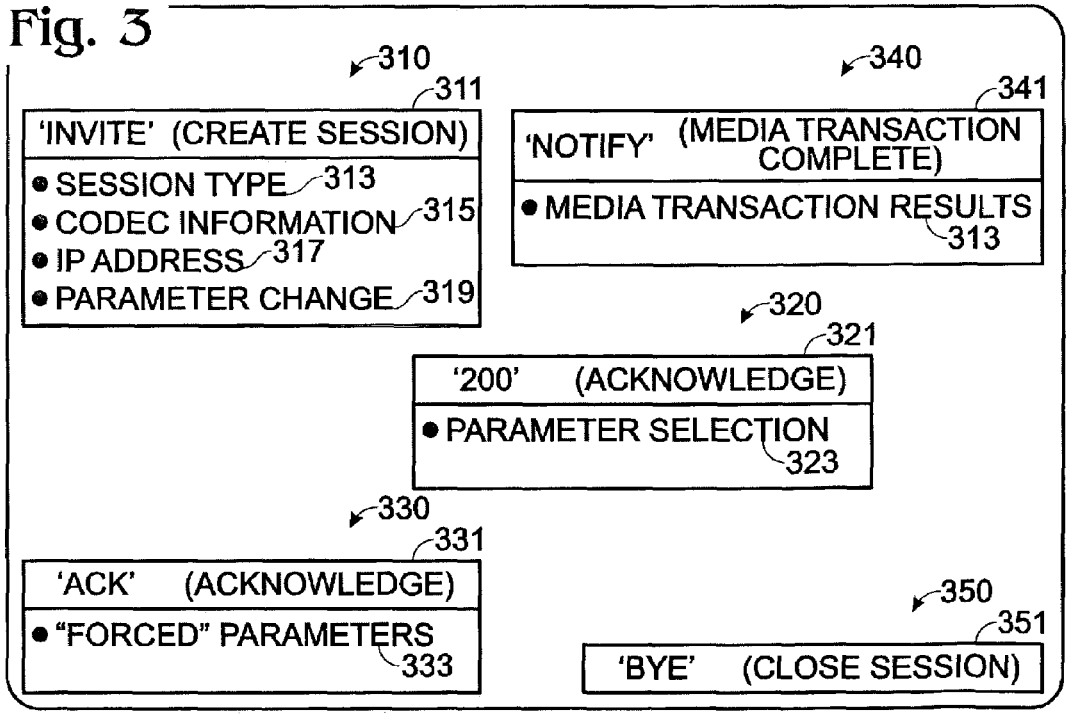

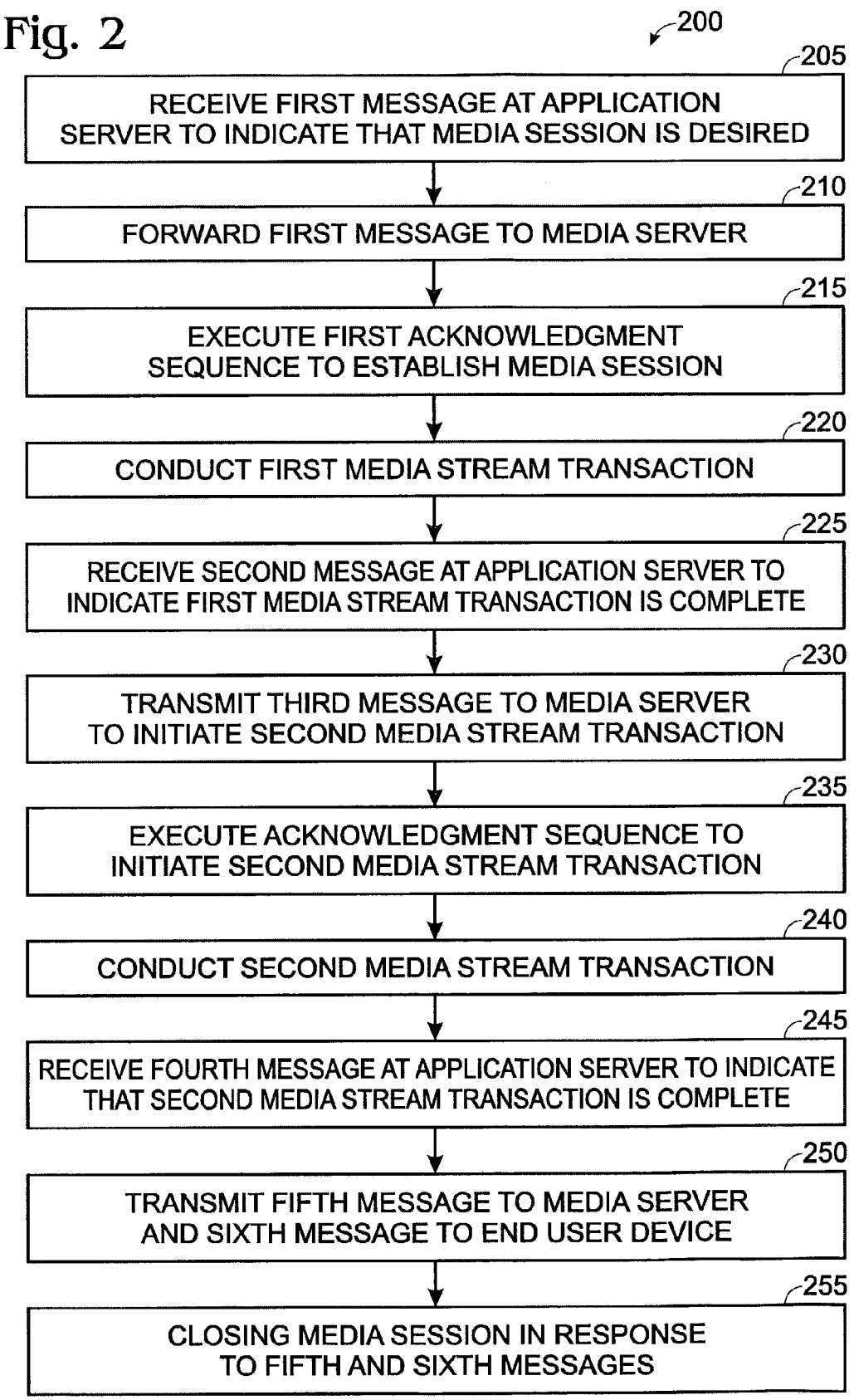

MANAGEMENT AND CONTROL FOR INTERACTIVE MEDIA SESSIONS

BACKGROUND OF THE INVENTION

1. Field of the Invention

The present invention relates generally to methods and apparatus for controlling communications network based media sessions and, more particularly, to management and control of interactive media sessions.

2. Description of Related Art

Management and control of an interactive media session conducted in a communications network, such as an Internet Protocol (IP) based media session, may be accomplished using various known protocols and techniques. These techniques include communicating voice, data and tones over a packet switched network, such as the Internet, using any number of packet based communication approaches (e.g., transmission-control protocol/Internet Protocol (TCP/IP)). In such approaches, audio information (e.g. voice and tones) is typically communicated using known voice over IP (VoIP) approaches, which typically communicate audio information in a digital, compressed format using a packet switched network communication protocol. Such techniques may be used, for example, by Internet telephony applications or by interactive-voice-response units (IVRUs), such as voice-mail servers.

Such techniques may be employed to execute various media transactions, such as retrieving voice mail messages, conducting banking transactions, making airline flight reservations, etc. Such transactions may be carried out over an interactive media session using, for example, the techniques mentioned above. Typically, an interactive media session (such as a real-time protocol (RTP) session) is established, a single transaction is conducted and the interactive media session is torn down, or closed. Each successive media transaction includes renegotiating, for example, and RTP session, even though the user may perceive the sequence as a single session (e.g., a single call to the user's bank), such as is described further below. The RTP standard is described in Internet Engineering Task Force document RFC 1889, which is known to those working in this area and is hereby incorporated herein by reference.

Using current approaches to accomplish a sequence of different media transactions, an end user contacts a media server, which may be, for example, a voice mail sever, a banking transaction server, or an airline reservation sever, where these servers typically comprise a general purpose, or special purpose computing platform. In a typical communications network the user may contact the media server via an application server. In this context, an application server may act as network access server (e.g., a gateway) for connecting an end user device with the media server. Such situations are described in further detail hereinafter.

In the context of the user contacting a media server to conduct banking transactions, the following sequence may take place using current techniques. A message is sent to the media sever by an end-user device, the media server then negotiates communications parameters for the media session with an application server and/or the end user device. Once the media session is established, the media server may then, for example, transmit an audio stream to the user, prompting the user to enter an account number and a personal identification number. The user may then enter this information and the media server may communicate the user's account balance information. After this transaction is complete, the media session is closed.

If, for example, the end user desires to transfer money from one account to another (e.g. conduct another media transaction), a second media session is then opened in the same fashion as described above. Such an approach has certain disadvantages. For example, because a new media session is established for each transaction, the end user may experience skipping or clipping in the media streams that are part of the transactions due to the need to renegotiate communications parameters for each transaction. Also, the user may experience inconsistent quality of service. Such inconsistent quality of service results from the fact that the same logical and/or physical communication path would typically not be used for subsequent transactions. In this respect, different physical devices (such as physical network connections) may be used for each different media transaction, thus resulting in potentially differing quality of service for each media transaction. Such disadvantages may result in the user having to repeat one or more transactions due to media information being lost due to such clipping, skipping or inconsistent quality of service. Based on the foregoing, alternative approaches for managing and/or controlling interactive media sessions are desirable.

SUMMARY OF THE INVENTION

In a first embodiment of a method for controlling a media session, an application server receives a first message from an end user device. The first message is then forwarded from the application server to a media server. As a result of this first message, an interactive media session is established between the media server and the end user device. For example, the media server may be a voice mail server, the application server may be a network access server and the end user device may be a computing platform running an Internet telephony application. Of course, other possibilities exist. After the interactive media session is established, a first media transaction (e.g. an interactive media transaction) is conducted between the media server and the end user device via the application server using the media session. After the first media transaction is complete, a second message is received by the application server from the media server to indicate that the first media transaction is complete.

The application server then transmits a third message from the application server to the media server to initiate a second media transaction using the media session. The second media transaction is conducted and, after the second transaction is complete, a fourth message is received by the application server from the media server to indicate the second transaction is complete. These transactions may, as indicated above, be executed to retrieve voice mail messages, conduct banking transactions, or make airline reservations, among numerous other possibilities.

In another embodiment of a method for controlling a media session, a first session-initiation protocol (SIP) 'INVITE' message is sent from an end user device to a media server (such as via an application server). A first acknowledgement sequence is then executed to establish a real-time protocol (RTP) session between the end user device and the media server. After the RTP session is established, a first media transaction is conducted between the media server and the end user device via the application server using the RTP session. The application server then receives a first SIP 'NOTIFY' message from the media server to indicate that the first media transaction is complete.

The application server then transmits a second INVITE message to the media server to initiate a second media transaction using the RTP session. The second media transaction is then conducted between the media server and the end user device via the application server using the RTP session. The media server then transmits a second NOTIFY message to the application server to indicate that the second media transaction is complete. Of course, additional media transactions may be conducted. When no further media transactions are desired, the application server transmits a first SIP 'BYE' message to the media server and a second BYE message to the end user device. These BYE messages result in the media session being closed.

Such approaches for controlling communications network based media sessions address, at least in part, the foregoing described disadvantages of current approaches. In this respect, maintaining an interactive media session open for use by successive, different media transactions provides a consistent quality of service to a user for successive media transactions. It is also reduces the effects of clipping and skipping that are associated with opening a new interactive media session for each different media transaction.

BRIEF DESCRIPTION OF THE DRAWINGS

The following detailed description makes reference to the appended drawings, in which:

FIG. 1 is a block diagram illustrating a network arrangement, which may be used to implement embodiments of methods in accordance with the invention;

FIG. 2 is a flowchart illustrating an embodiment of a method according to the invention;

FIG. 3 is a diagram illustrating various session-initiation protocol (SIP) commands that may be employed by embodiments of methods in accordance with the invention.

DETAILED DESCRIPTION OF PREFERRED EMBODIMENTS OF THE INVENTION

Exemplary Network for Conducting Media Transactions

Figure 4A:
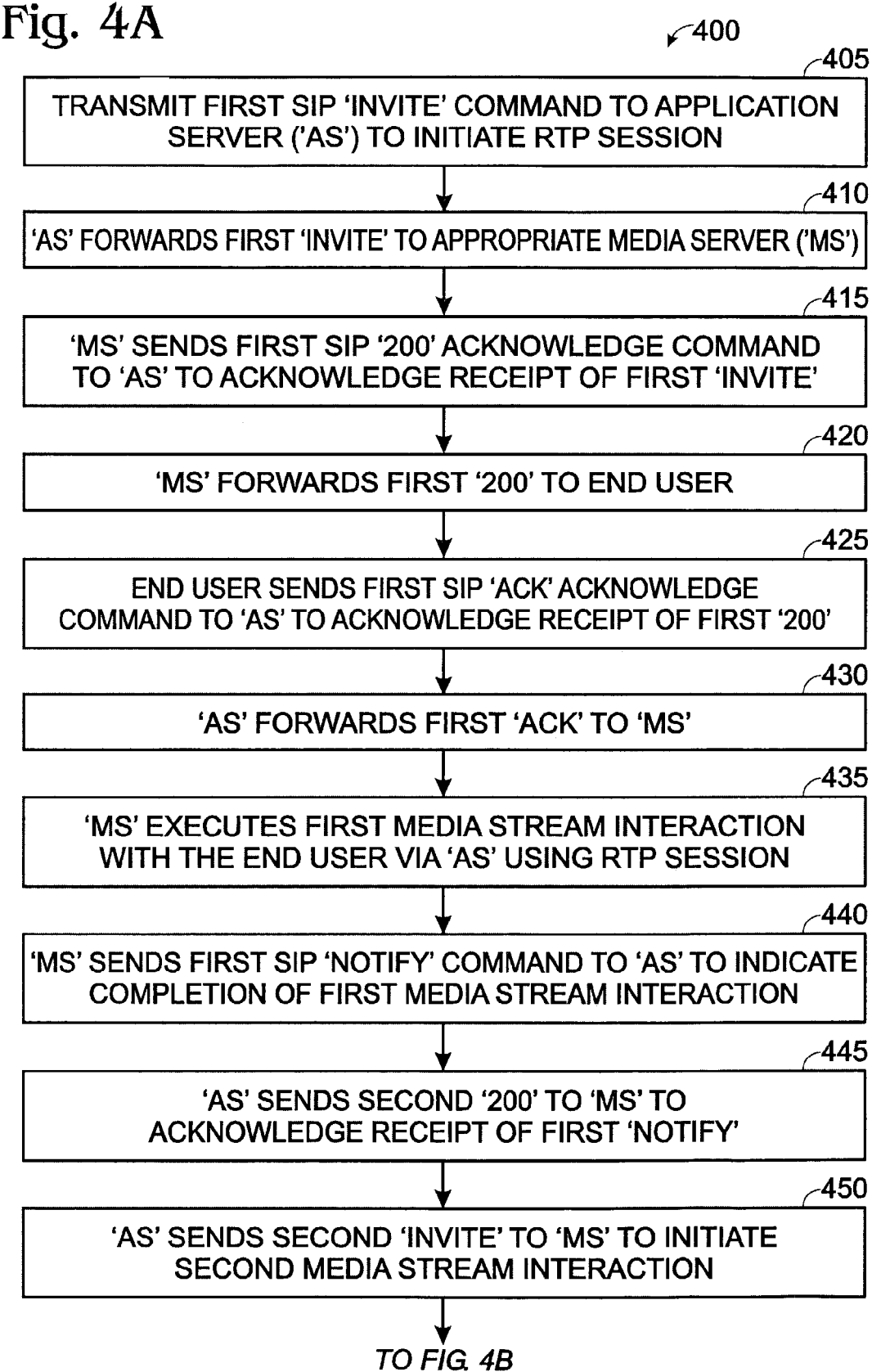
FIGS. 4A and 4B show a flowchart illustrating another embodiment of a method in accordance with the invention that employs the SIP commands shown in FIG. 3.

FIG. 1 illustrates a communications network 100, which may be used to implement embodiments of methods for conducting multiple, different media transactions in accordance with the invention. The network 100 includes end user devices 105 and 110, which are computing platforms implementing, for example, Internet telephony applications (and voice over Internet Protocol (VoIP) functions), or other communication applications, such as messaging applications. The end user devices 105 and 110 may take the form of a personal computer, a laptop computer, a personal data assistant (PDA), or any other suitable computing platform. The end user devices are coupled with an application server 115 via a packet switched network 120. The packet network 120 may be, for example, the Internet. The application server 115 may take the form of a network access server, which may direct end user devices 105 and 110 to communicate with an appropriate media server, such as media server 125.

The application server 115 is coupled with the media server 125 via a packet switched network 130. It will be appreciated that the packet switched networks 120 and 130 may comprise the same network (such as the Internet), or may be separate networks. For example, while the packet network 120 may be the Internet, the packet network 130 may comprise a, local area network or a virtual private network (VPN). In this regard, for the situation where the media server 130 is a media server operated by a bank and contains customer account information, the application server 115 may act as network access server for the bank's VPN (e.g. the packet network 130) to connect bank customers with the media server 130 via the VPN in order to conduct interactive banking transactions.

As an alternative, a user may conduct such media transactions (e.g. retrieve voicemail, conduct banking transactions, etc.) using end user devices 135, 140 and 145, for example. The end user devices 135 and 140, for the network 100, take the form of landline telephones, while the end user device 145 takes the form of a wireless telephone. In this respect, the end user devices 135-145 communicate with the application server 125 via a transport network 150, such as a public switched telephone network (PSTN) (for the end user devices 135 and 140) or a mobile switching center (MSC) (for the end user device 145). The devices are, of course, exemplary and other devices may used, such as personal data assistants (PDAs) that include modems or, alternatively the end user device 110 may communicate with the application server 115 via the transport network 150 through either a landline modem (using a PSTN) or a wireless modem (using an MSC). Those skilled in the art will appreciate that the network 100 is exemplary, that numerous configurations and alternatives for such a network exist, and that the particular configuration used is not important. As such, the particular configuration shown in FIG. 1 is, of course, not limiting to the scope of the invention.

Exemplary Method of Conducting Media Transactions

Referring now to FIG. 2, a flow chart illustrating a method 200 for conducting multiple media transactions is shown. The method 200 shown in FIG. 2 is described generally, independent of any particular protocols or standards. A more specific method for conducting multiple media transactions (e.g. where the media session is a real-time protocol (RTP) session controlled by session initiation protocol (SIP) messages) will be discussed with reference to FIGS. 3 and 4. As was previously noted, the method 200 may be implemented using the network 100 shown in FIG. 1, though the invention is not so limited. In this respect, the method 200 will be discussed (without limitation) with reference to FIG. 1, as well as FIG. 2.

At block 205, the method 200 comprises receiving a first message from an end user device (such as end user devices 105, 110, 135, 140 and 145) at an application server, such as the application server 115. The message received indicates that the end user device desires to initiate (e.g. is requesting) opening an interactive media session. As was previously discussed, the application server 115 may be a network access server, or may be any other server that may redirect end-users to an appropriate media server. In this regard, at block 210, the application server 115 then forwards the first message to a media server, such as the media server 130. As previously described, the first message may be communicated to the application server 115 via the packet switched network 120, the transport network 150, or any other appropriate communication network. Similarly, the first message may be forwarded to the media server 125 via the packet switched network 130, or via any appropriate communication network.

The first message communicated to the media server at blocks 205 and 210 of the method 200 typically includes one or more media session parameters for establishing an interactive media session. Such media session parameters may include a data session type (e.g. data, audio, video/audio), a list of codecs available on the end user device, a list of supported communication protocols, among other possible parameters. These media session parameters may be included in the first message by the end user device, or may be supplied by the application server, depending on the particular embodiment.

When the first message is received at the media server 125, an acknowledgement sequence is then executed at block 215 to negotiate communications parameters and establish an interactive media session between the end user device and the media server. Such an acknowledgement sequence may include, transmitting a first acknowledgement message from the media server to the application server and then forwarding that first acknowledgement message from the application server to the end user device. The first acknowledgement message, in similar fashion to the first message sent to the media server, may include a list of available codecs on the media server, a list of supported communication protocols, and a selection of preferred parameters based on a comparison of the parameters sent in the first message to the available resources of the media server. Of course, there are numerous other possible parameters that may be sent in the first acknowledgement message.

A second acknowledgement message is then sent from the end user device to the application server. Alternatively, the application server may create the second acknowledgement message. For the first case, the second acknowledgement message is then forwarded from the application server to the media server (and merely sent for the alternative case). In this embodiment, the second message includes either an indication of acceptance of the selected media session parameters included in the first acknowledgement message or, alternatively includes a set of media session parameters that the end user device desires to use (e.g. force the use of) for the interactive media session. After the first acknowledgement sequence is completed, the interactive media session between the end user device and the media server is then open.

With the interactive media session open, a first media transaction is then conducted between the media server and the end user device at block 220. This first media transaction is conducted via the application server 115 for the network 100 shown in FIG. 1. As was previously indicated, such a media transaction may be employed to allow a user to conduct banking transactions, among other possibilities. In the banking transaction context, such media transactions may include transmitting a first media stream from the media server to the end user, such as an audio stream to prompt user to enter identifying information (e.g. a social security number or an account number). For the network 100, this first media stream is sent from the media server 125 to the end user device via the application server 115.

The first media transaction may then include transmitting a second media stream from the end user device to the media server 125 via the application server 115. This second media stream, for the bank transaction example may be a sequence of dual-tone-multi-frequency (DTMF) tones corresponding to the user's identifying information, in response to the first media stream.

After the media server receives the second media stream, at block 225, the media server 125 sends a message to the application server 115 to indicate that the first media transaction is complete (e.g. the identifying information has been requested and received). At the conclusion of this first media transaction, as was noted above, current approaches then tear down (close) the interactive media session. However, from the user's viewpoint, such a banking session would typically not be complete, as merely providing an account number is usually not the object of such a transaction sequence, and additional media transactions are typically desired. Thus, as was described above, current approaches would then require establishing another interactive media session to accomplish each subsequent transaction. For such approaches, in addition to the resources employed to renegotiate for each interactive media session, these approaches also have the disadvantages, as were described above, associated with clipping and skipping of the media streams involved in such transactions.

For the method 200, such disadvantages may be avoided. In this regard, rather than tearing down (closing) the interactive media session, the interactive media session is held open after the first media transaction is complete. Thus, a subsequent media transaction is accomplished in the following fashion.

At block 230, a message is sent from the application server to the media server to initiate a second media transaction using the still open media session. This message may include any communications parameters that the application server desires to change, such a selecting an improved codec, for example. The method 200 is not limited in this regard and other parameters may be changed or, alternatively, no parameters may be changed. A second acknowledgement sequence may then be conducted between the media server at block 235. It will be appreciated that the second acknowledgement sequence, as compared with the first acknowledgement sequence, is substantially abbreviated. In this regard, as the media session is already open, the only negotiation that would occur is with respect to any parameters that are changed, as was just noted.

After the second acknowledgement sequence is completed at block 235, a second media transaction may then be conducted at block 240. For the banking transaction example, the second media transaction may include sending an audio stream from the media server to the end user device to prompt the user to select an account (e.g. checking or savings) for which information is desired. The user's selection is then sent from the end user device to the media server (e.g. as touch-tone or a DTMF tone). The media server 125 then transmits an audio stream containing the relevant account information to the end user device.

After the second media transaction is complete, the media server 125 may send another message to the application server 115 to indicate that the second media transaction is complete at block 245. If further media transactions are desired, the interactive media session will continue to be held open and those further transactions may be conducted in a similar fashion as just described.

When the application server 115 determines that no further interactive media sessions are required, at block 250 the application server 115 transmits messages to both the media server 125 and the end user device, these messages indicating that no further media transactions will be conducted using the current interactive media session. The application server 115 may make this determination in a number of ways. For example, the end user device may indicate that no further transactions are desired based on user input, or the interactive media session may time out (e.g. there is no activity over the interactive media session for a predetermined period of time). Of course, the application server 115 may make the determination to close the interactive media session in various other ways, and the invention is not limited to these examples. In response to such messages from the application server 115, at block 255, the interactive media session is closed (e.g. via acknowledgement from the end user device and the media server) and the resources employed to maintain the interactive media session are freed up.

SIP Commands for Managing Interactive Media Sessions

Referring now to FIG. 3, a diagram illustrating various session-initiation protocol (SIP) messages that may be employed to implement an exemplary method of the invention is shown. SIP is a standard protocol known to those of skill in this area that is typically used to set up and close (tear down) data sessions, such as interactive media sessions. It is noted, that for purposes of this disclosure the terms "SIP command" and "SIP message" are used interchangeably and the use of one term is not limiting with respect to the other.

As shown in FIG. 3, a SIP 'INVITE message 310 includes an INVITE message designator 311. The INVITE message 310 further includes a media session type designator 313. The media session type may, for example, indicate that the interactive media session to be opened will be a real-time protocol (RTP) session. The INVITE message 310 also includes codec information 315 (e.g. codecs available on an end user device) and an IP address 317, which may be the IP address of the end user device in certain embodiments. The INVITE message 310 also includes parameters changes 319, which indicates parameters that are to be changed for follow on media transactions (not a first media transaction) conducted over an interactive media session, as has been previously discussed. It will be appreciated that information other than the information shown in FIG. 3 may be included with the INVITE message 310, or some of the information shown in FIG. 3 may be excluded from the INVITE message 310. It will also be appreciated that for each of the commands shown in FIG. 3, those commands may include more or less information than is discussed herein.

A SIP '200' message 320 is also shown in FIG. 3. As is known, the SIP 200 message is used as a general acknowledgement message. For purposes of this disclosure, the 200 message 320 includes a SIP 200 message designator 321 and communication parameter selection information 323, such as may be communicated by a media server in response to a message that requests an interactive media session be opened, as has been previously described.

A SIP 'ACK' message 330 is also shown in FIG. 3. The ACK message 330 is typically used as a handshake acknowledgement message for establishing communication sessions, such as RTP sessions. In this respect, the ACK message 330 includes an ACK message designator 331. The ACK message 331 also includes information regarding forced communication parameters 333, such as may be defined by an end user device, as was previously described.

FIG. 3 further depicts a SIP 'NOTIFY' message 340, that may be used to indicate the completion of a media transaction, as has been discussed above. In this respect, the NOTIFY message 340 includes a NOTIFY message designator 341. The NOTIFY message 340 further includes media transaction results 343. The transaction results 343 may indicate whether a media transaction was completed successfully, or may pass information from the media transaction to, for example, an application server.

FIG. 3 also illustrates a SIP 'BYE' message 350. The BYE message 351 is used to close (tear down) data sessions, such as interactive media sessions implemented using an RTP session. In this respect, the BYE message 351 includes a BYE message designator 351. As was previously discussed, it will be appreciated that information may added and/or removed to the SIP messages/commands shown in FIG. 3 in accordance with published SIP standards, and the SIP messages/commands described herein are illustrative and not limiting.

Alternative Method for Conducting Media Transactions

Figure 4B:
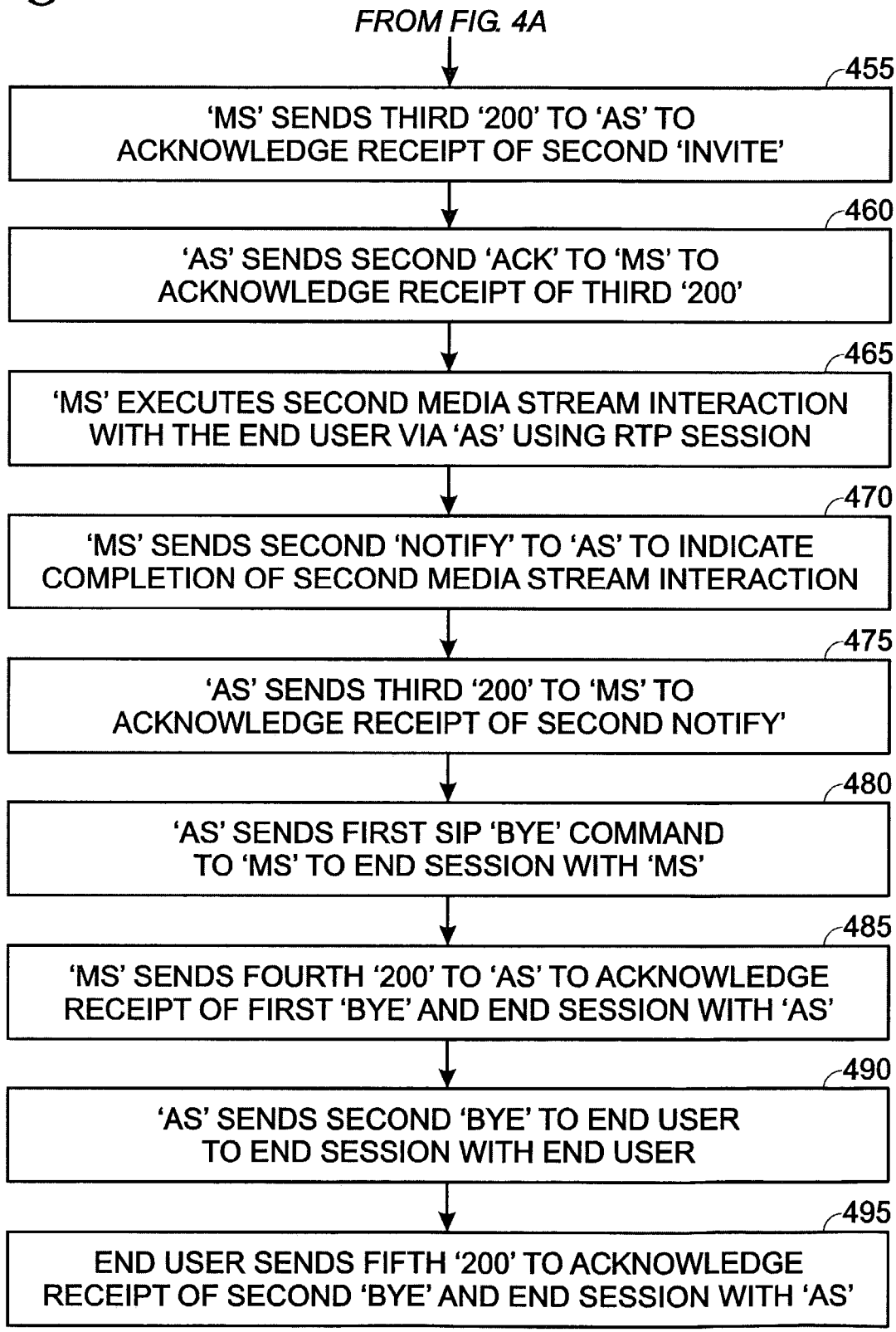

Referring now to FIGS. 4A and 4B, a flowchart illustrating a method 400 for conducting multiple media transactions using an RTP session and the SIP commands illustrated in FIG. 3 is shown. The method 400, at block 405, includes transmitting a first SIP INVITE message from an end user device to an application server to initiate opening an RTP interactive media session. The first INVITE message is forwarded from the application server to a media server at block 410. As was described with reference to FIG. 3, the INVITE message contains communications parameters that may be used to establish an interactive media session.

The media server then sends a SIP 200 message to the application server at block 415 to acknowledge the INVITE message. The SIP 200 message is then forwarded to the end user device at block 420. The SIP 200 message may include communication parameters, as were previously described with reference to the SIP 200 message 320 shown in FIG. 3. At block 425 of the method 400, the end user device sends an ACK message to the application server, which is forwarded to the media server at block 430. The ACK message acknowledges receipt of the 200 message and may also include "forced" communications parameters from the end user device or, alternatively from the application server. The SIP 200 message and the ACK message are part of an acknowledgement sequence, which after executing, the interactive media session is open. For this particular embodiment, the interactive media session is an RTP session Once the RTP session is open, a first media transaction is conducted at block 435 using the RTP session. The first media transaction may be, for example, a media transaction for conducting a banking transaction, for retrieving voicemail messages, or for making airline reservations, as has been previously described. Of course, the media transactions are not limited to these exemplary activities, and numerous other possibilities exist.

Once the first media transaction is complete, at block 440, the media server sends a SIP 'NOTIFY' message to the application server to indicate that the first media transaction is complete. As was previously noted, the NOTIFY message may include one or more results corresponding to the media transaction or may contain information obtained during the media transaction. The application server acknowledges receipt of the NOTIFY message by sending a SIP 200 message to the media server at block 445.

As was discussed with respect to interactive media session of the method 200 shown in FIG. 2, the RTP session will be held open for subsequent media transactions. In this respect, the application server transmits a second INVITE message to the media server to initiate a second media transaction at block 450. The second INVITE message, as was previously noted, may contain communications parameters that are to be changed for the second media transaction. The media server acknowledges the INVITE message at block 455 by sending a SIP 200 message to the application server. This SIP 200 message may also contain information related to changed communication parameters. At block 460, the application server sends an ACK message to the media server, which acknowledges receipt of the SIP 200 message and may also finalize changed communication parameters. The second media transaction is then conducted via the RTP session at block 465 of the method 400.

After the second media transaction is complete, a second NOTIFY message is sent from the media server to the application server at block 470 to indicate that the second media transaction is complete. The application server then sends a SIP 200 message to the media server at block 475 to acknowledge receipt of the NOTIFY message.

When no further media transactions are to be performed over the RTP session, the application server transmits a first SIP 'BYE' message to the media server at block 480 and the media server acknowledges this BYE message by sending a SIP 200 message to the application server at block 485. The application server also sends a second BYE message to the end user device at block 490, which the end user device acknowledges by sending a SIP 200 message to the application server at block 495. The RTP session is closed as a result of the operations performed at blocks 480-495.

CONCLUSION

Persons skilled in the art will appreciate that variations from the illustrated embodiments can be made without departure from the spirit and scope of the invention. This true spirit and scope will be found by reference to the appended claims.

What is claimed is:

1. A method for controlling a media session having at least two transactions comprising:
    receiving a first message from an end user device at an application server to initiate a media session;
    forwarding the first message from the application server to a media server;
    establishing the media session between the end user device and the media server;
    initiating a first media transaction between the media server and the end user device via the application server using the media session;
    conducting the first media transaction between the media server and the end user device via the application server using the media session, the first media transaction being conducted by transmitting a first media stream from the media server to the end user device via the application server and transmitting a second media stream from the end user device to the media server via the application server in response to the first media stream;
    completing the first media transaction between the media server and the end user device via the application server using the media session;
    receiving a second message from the media server at the application server, the second message indicating that the first media transaction is complete;
    transmitting a third message from the application server to the media server to initiate a second media transaction between the media server and the end user device via the application server using the same media session used for the first media transaction;
    conducting the second media transaction between the media server and the end user device via the application server using the same media session used for the first media transaction, the second media transaction being conducted by transmitting a third media stream from the media server to the end user device via the application server and transmitting a fourth media stream from the end user device to the media server via the application server in response to the third media stream;
    completing the second media transaction between the media server and the end user device via the application server using the same media session used for the first media transaction; and
    receiving a fourth message from the media server at the application server, the fourth message indicating that the second media transaction is complete.

2. The method of claim 1, further comprising:
    transmitting a fifth message from the application server to the media server and a sixth message from the application server to the end user device, wherein the fifth and sixth messages result in the media session being closed.

3. The method of claim 1, further comprising executing an acknowledgement sequence to establish the media session in response to the first message.

4. The method of claim 3, wherein executing the acknowledgement sequence comprises negotiating one or more communications parameters for the media session.

5. The method of claim 3, wherein executing the acknowledgement sequence comprises:
    receiving a first acknowledgement message from the media server at the application server;
    forwarding the first acknowledgement message from the application server to the end user device;
    receiving a second acknowledgement message from the end user device at the application server; and
    forwarding the second acknowledgement message from the application server to the media server.

6. The method of claim 5, wherein the first acknowledgement message is
    a session-initiation protocol (SIP) '200' message; and
    the second acknowledgement message is a SIP 'ACK' message.

7. The method of claim 3, wherein the acknowledgement sequence is executed between the media server and the end user device via the application server.

8. The method of claim 1, further comprising executing an acknowledgement sequence to initiate the second media transaction in response to the third message.

9. The method of claim 8, wherein the acknowledgement sequence is executed between the media server and the application server.

10. The method of claim 1, wherein the media session is a real-time protocol (RTP) media session.

11. The method of claim 1, wherein the first, second, third and fourth messages are session-initiation protocol (SIP) messages.

12. The method of claim 11, wherein:
    the first message and the third message are SIP INVITE messages; and
    the second message and the fourth message are SIP NOTIFY messages.

13. The method of claim 12, wherein at least one of the INVITE messages includes one or more communications parameters for the media session.

14. The method of claim 12, wherein at least one of the NOTIFY messages includes results from its respective media transaction.

15. The method of claim 1, wherein the end user device is a computing device implementing Internet telephony functions, the computing device being coupled with the application server via a packet switched network.

16. The method of claim 15, wherein the end user device is a telecommunications device, the telecommunications device being coupled with the application server via a transport network.

17. The method of claim 16, wherein the transport network is one of a public switched telephone network and a mobile switching center.

18. A method for conducting plural media transactions in a single media session comprising:
    transmitting a first session-initiation protocol (SIP) 'INVITE' message from an end user device to an application server;
    forwarding the first INVITE message from the application server to a media server;
    executing a first acknowledgement sequence to establish a real-time protocol (RTP) session between the end user device and the media server;

initiating a first media transaction between the media server and the end user device via the application server using the RTP session;

conducting the first media transaction between the media server and the end user device via the application server using the RTP session, the first media transaction being conducted by transmitting a first media stream from the media server to the end user device via the application server and transmitting a second media stream from the end user device to the media server via the application server in response to the first media stream;

completing the first media transaction between the media server and the end user device via the application server using the RTP session;

receiving a first SIP 'NOTIFY' message from the media server at the application server, the first NOTIFY message indicating that the first media transaction is complete;

transmitting a second INVITE message from the application server to the media server to initiate a second media transaction using the same RTP session used for the first media transaction;

conducting the second media transaction between the media server and the end user device via the application server using the RTP session, the second media transaction being conducted by transmitting a third media stream from the media server to the end user device via the application server and transmitting a fourth media stream from the end user device to the media server via the application server in response to the third media stream;

completing the second media transaction between the media server and the end user device via the application server using the same RTP session used for the first media transaction;

transmitting a second NOTIFY message from the media server to the application server, the SECOND notify message indicating that the second media transaction is complete; and transmitting a first SIP 'BYE' message from the application server to the media server and a second BYE message from the application server to the end user device, wherein the first and second BYE messages result in the media session being closed.

19. The method of claim 18, wherein the RTP session is established based on communications parameters communicated between the end user device and the media server as part of the first INVITE message and the first acknowledgement sequence.

20. The method of claim 18, further comprising executing a second acknowledgement sequence in response to the second INVITE message, the second acknowledgement sequence being used to modify one or more communications parameters of the RTP session.

21. An application server for managing multiple communications network based media transactions in a single media session comprising:

a computing platform having software instructions stored therein, wherein the instructions, when executed, provide for:

receiving a first message from an end user device to initiate a media session;

forwarding the first message to a media server;

establishing the media session between the end user device and the media server;

initiating a first media transaction between the media server and the end user device via the application server using the media session;

conducting the first media transaction between the media server and the end user device using the media session, the first media transaction being conducted by transmitting a first media stream from the media server to the end user device via the application server and transmitting a second media stream from the end user device to the media server via the application server in response to the first media stream;

completing the first media transaction between the media server and the end user device via the application server using the media session;

receiving a second message from the media server, the second message indicating that the first media transaction is complete;

transmitting a third message to the media server to initiate a second media transaction between the media server and the end user device via the application server using the same media session used for the first media transaction;

conducting the second media transaction between the media server and the end user device using the same media session used for the first media transaction, the second media transaction being conducted by transmitting a third media stream from the media server to the end user device via the application server and transmitting a fourth media stream from the end user device to the media server via the application server in response to the third media stream;

completing the second media transaction between the media server and the end user device via the application server using the same media session used for the first media transaction; and receiving a fourth message from the media server, the fourth message indicating that the second media transaction is complete.

22. The application server of claim 21, wherein the instructions further provide for:

transmitting a fifth message to the media server and a sixth message to the end user device, wherein the fifth and sixth messages result in the media session being closed.

* * * * *